Dec. 7, 1937.                A. E. HAGUE                2,101,254
                            TESTING CIRCUIT
                    Filed Sept. 16, 1936         8 Sheets-Sheet 1
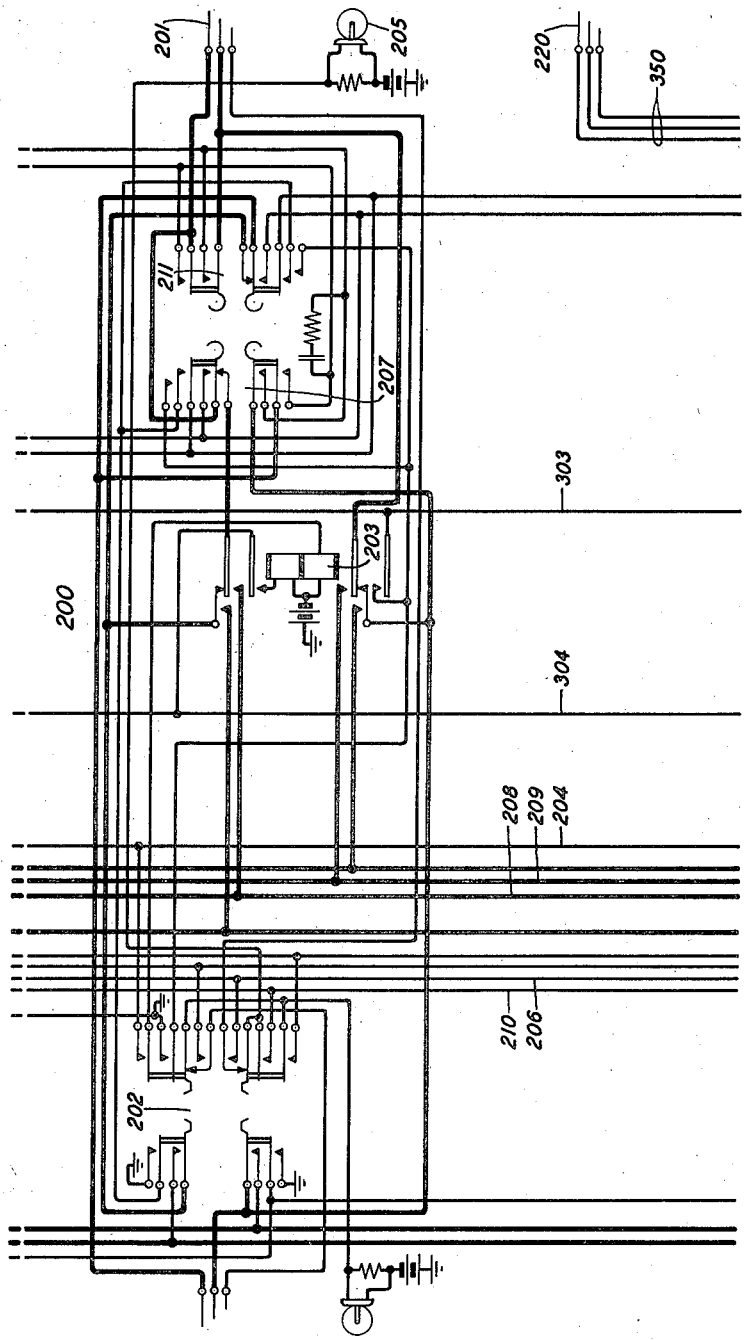
INVENTOR
A. E. HAGUE
BY P. C. Smith
ATTORNEY

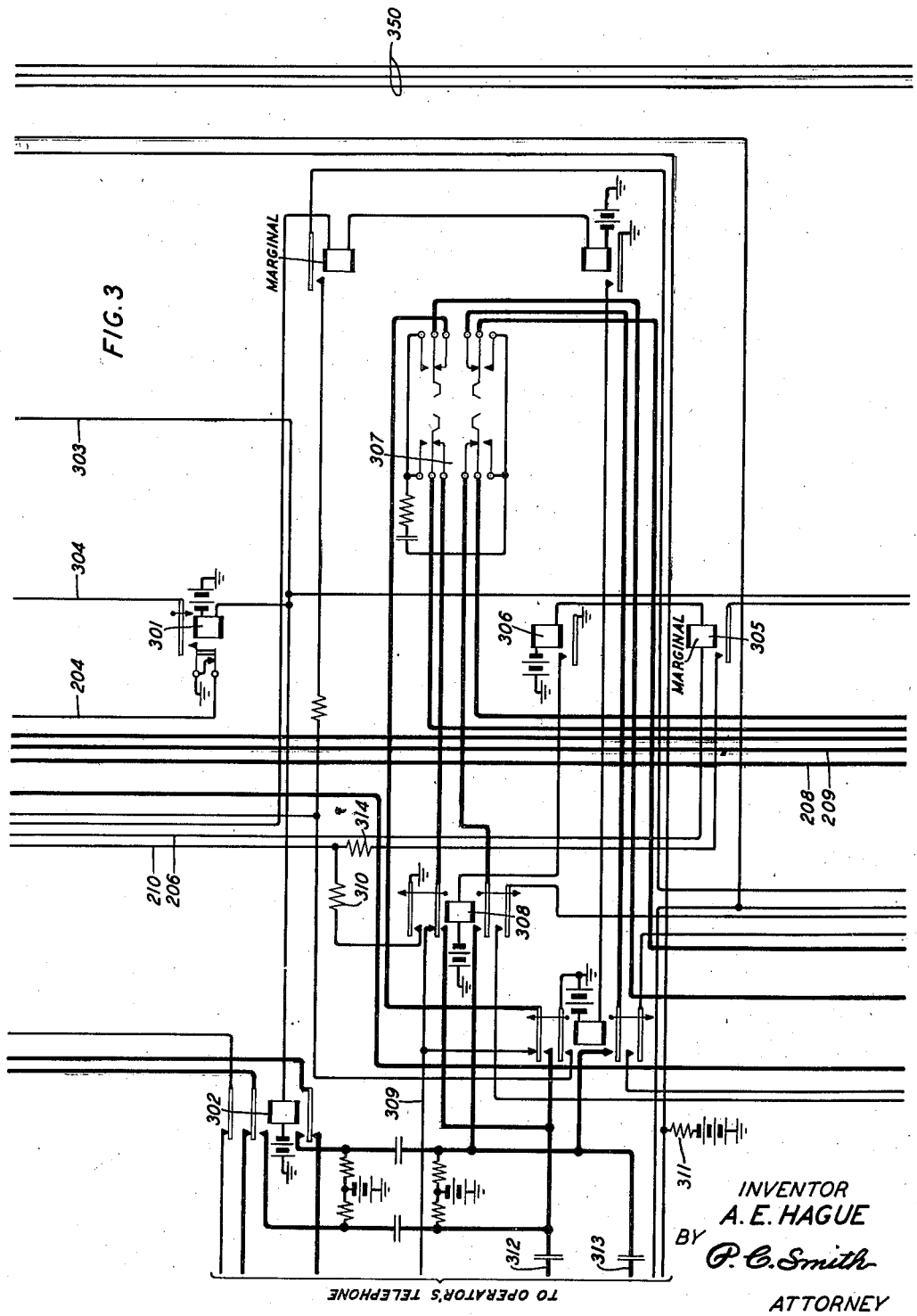

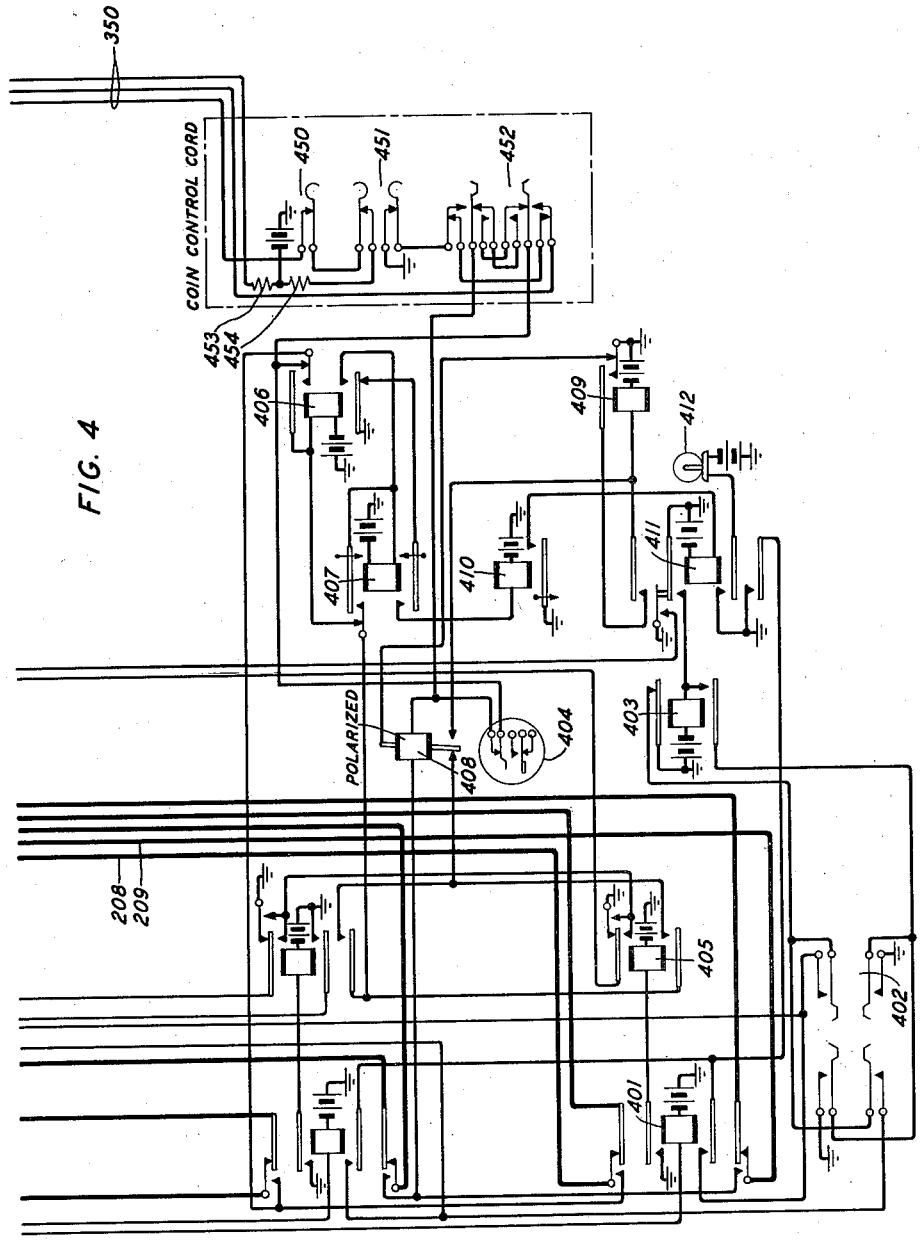

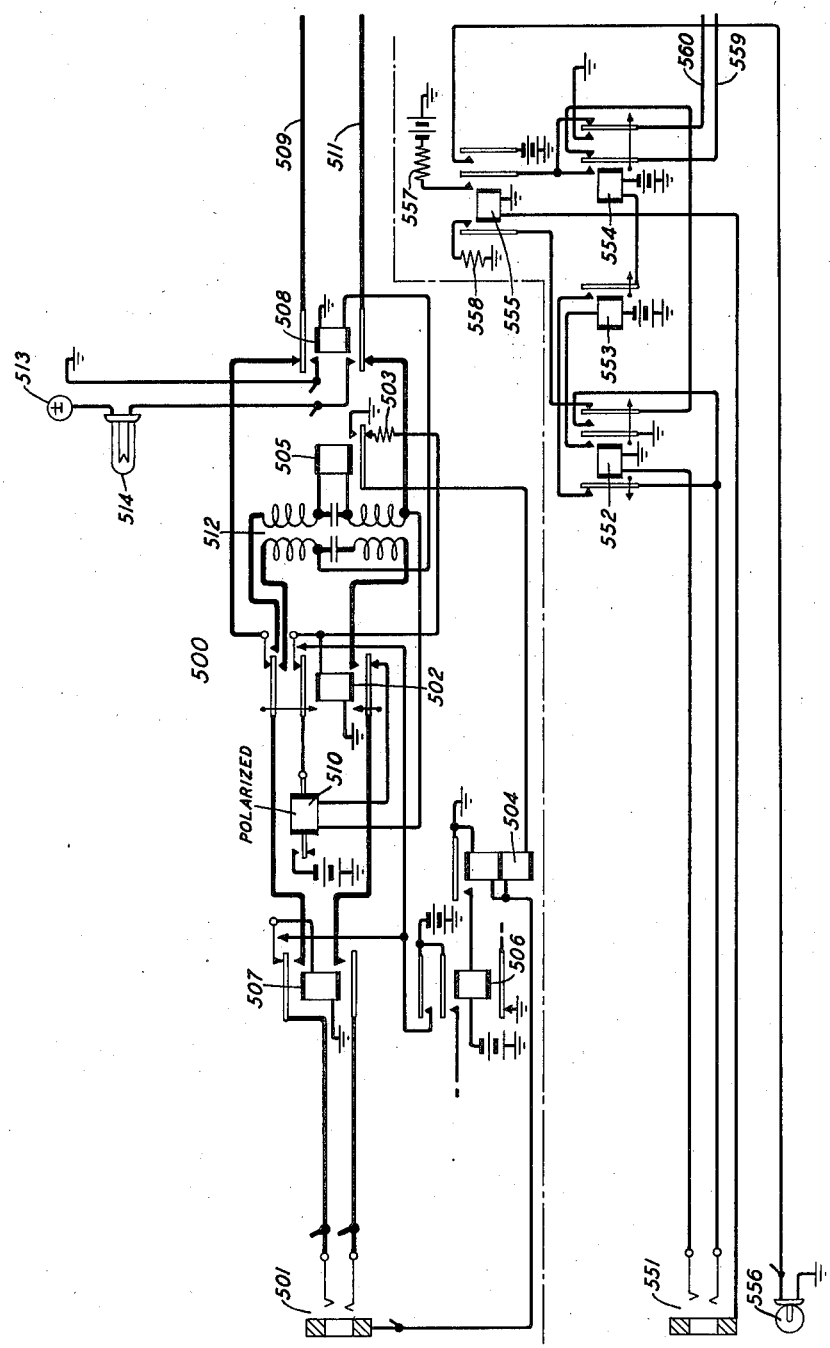

Dec. 7, 1937. A. E. HAGUE 2,101,254
TESTING CIRCUIT
Filed Sept. 16, 1936 8 Sheets-Sheet 5

INVENTOR
A. E. HAGUE
BY P. C. Smith
ATTORNEY

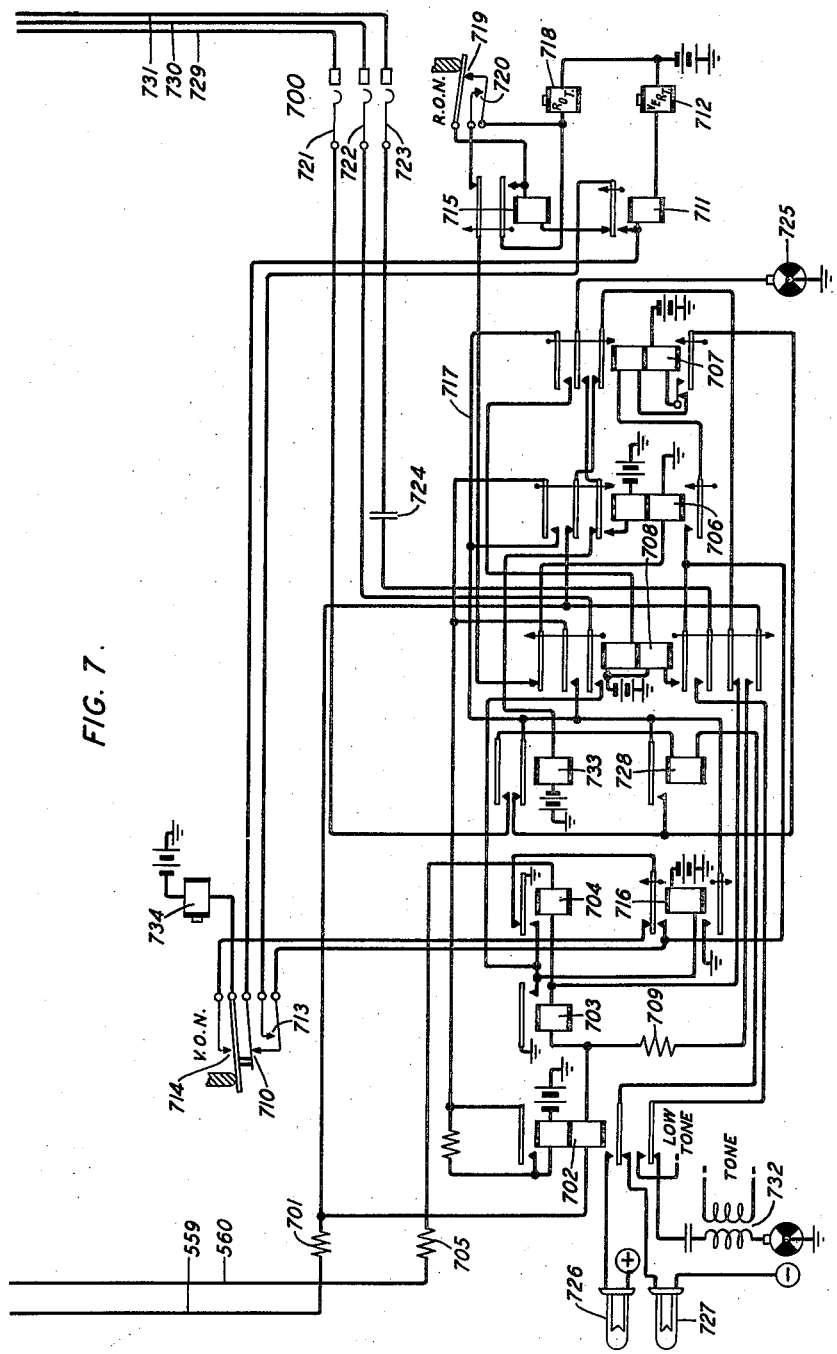

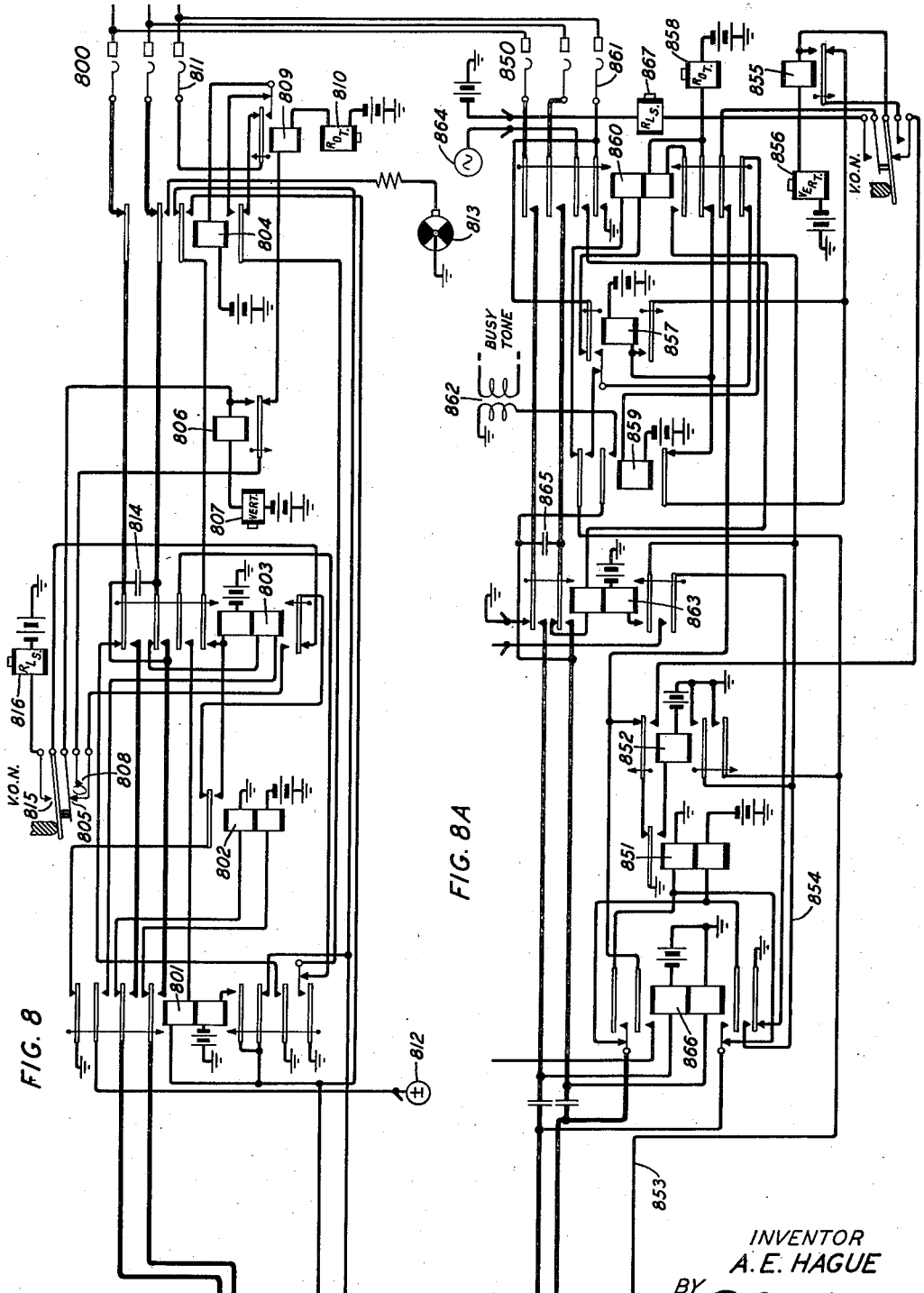

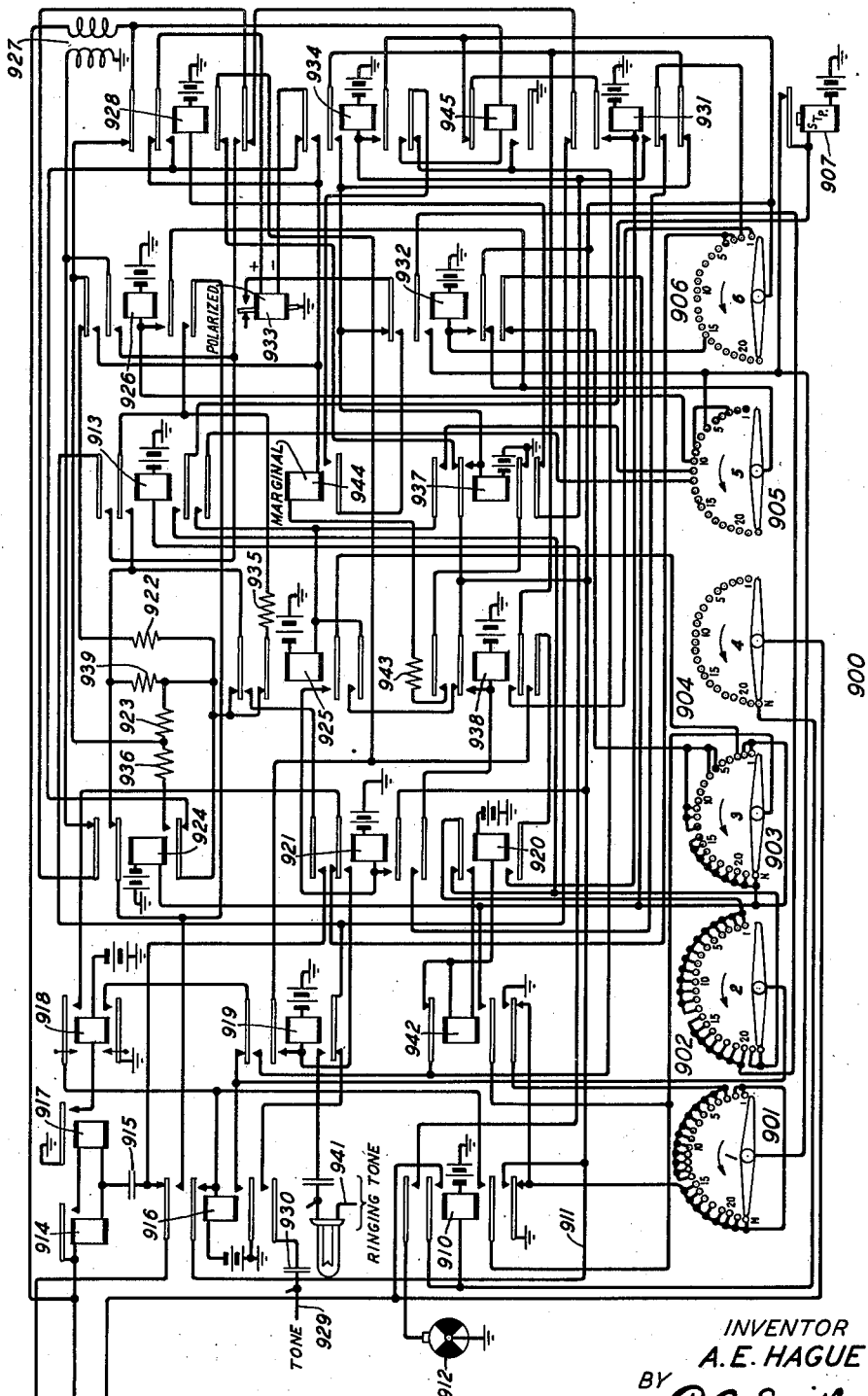

Patented Dec. 7, 1937

2,101,254

UNITED STATES PATENT OFFICE 2,101,254

TESTING CIRCUIT

Alfred E. Hague, West Orange, N. J., assignor to Bell Telephone Laboratories, Incorporated, New York, N. Y., a corporation of New York Application September 16, 1936, Serial No. 101,041

19 Claims. (Cl. 179—175.2)

This invention relates to telephone systems and has for its object to facilitate the testing necessary to the maintenance of efficient service.

Heretofore the testing of interoffice trunks has required the use of a second trunk to complete a return connection with the testing equipment and the services of a test man at the distant office to establish and change the connections between the trunks to be tested and the return trunk.

In accordance with the present invention, a test line is provided at the terminating office to which the trunks to be tested may be connected by means of a selector and connector. This test line is arranged to make a series of tests of the supervisory relay of the trunk and then to supply a number of test conditions across the trunk conductors for measured intervals during which tests may be applied. If such tests are applied the test line advances immediately to establish the next condition, whereas if the tests have not been applied at the end of the time interval it does not advance. The test line is arranged to discriminate between local and toll trunks to cancel the test conditions applicable only to toll trunks when used for testing local trunks. The supervisory tests are applied during one cycle of a step-by-step switch while the special test conditions are applied during additional revolutions of the switch.

The invention will be more clearly understood from a consideration of the following description in connection with the drawings in which:

Fig. 1 shows the manner in which the remaining drawings should be arranged;

Fig. 2 shows a toll cord circuit;

Fig. 3 shows a toll operator's position circuit;

Fig. 4 shows a toll operator's dial and coin control cord circuit;

Fig. 5 shows the trunk outgoing to a distant office;

Fig. 7 shows a coin control selector;

Fig. 8 shows a toll connector;

Figure 6:
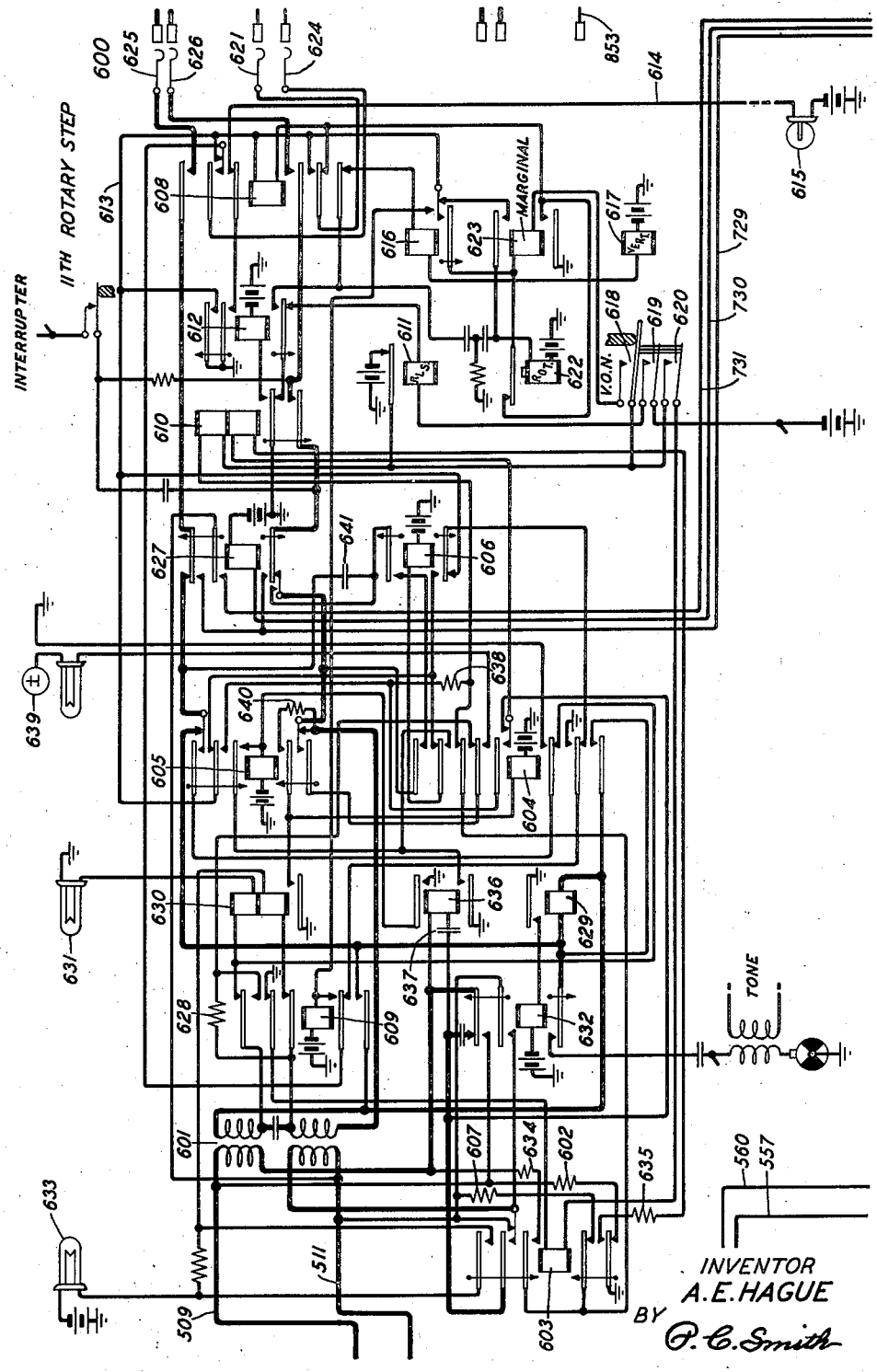
Fig. 6 shows a toll transmission selector.

Figure 8—A shows a local connector; and

Fig. 9 shows the test line forming the subject-matter of the invention.

When the test man wishes to make a test of toll trunks he occupies a toll operator's position and prepares for the test by operating the talking key 202 of one of the cords of that position, for example cord 200. The operation of key 202 closes a circuit from battery through the lower winding of relay 203, outer upper operated contact of key 202, conductor 204 to ground over the normal contacts of relay 301. Relay 203 in operating closes a circuit from ground over the middle upper operated contact of key 202, outer lower front contact of relay 203, conductor 303 to the windings of relays 301 and 302 in parallel. Relay 301 is slow to operate and after an interval removes the operating circuit of relay 203. However, before it does so it closes ground to conductor 304 completing a locking circuit for relay 203 which extends over the inner upper front contact and upper winding of relay 203 to battery. Relay 203 in operating extends the tip and ring of the plug 201 to conductors 208 and 209 which extend into the position circuit over the back contacts of relay 401 and the left normal contacts of splitting key 307.

The test man now makes a busy test of the first trunk to be tested and, assuming this to be the trunk 500 shown in Fig. 5, if this trunk is busy, battery supplied to the sleeve of the pack 501 from the connecting cord will extend over the tip of plug 201, inner upper normal contact of key 207, middle upper front contact of relay 203, conductor 208, upper back contact of relay 401, upper left normal contact of key 307, upper back contact of relay 308 to conductor 309 producing a click in the operator's telephone (not shown).

Assuming, however, that the trunk is idle and ready to be used, the test man will insert plug 201 into jack 501, completing a circuit from ground through the upper winding of relay 504 and in parallel therewith from ground through the winding of relay 502, resistance 503, lower back contact of relay 505, and lower winding of relay 504 and thence over the sleeve of jack 501, sleeve of plug 201, inner lower operated contact of key 202, conductor 206, windings of relays 305 and 306 in series to battery. Relay 306 operates, but relay 305 being marginal does not operate at this time. Relay 306 closes an obvious circuit for relay 308 which opens the busy test circuit and extends the tip and ring conductors through to the operator's telephone. Relay 308 also connects ground over its outer upper front contact through resistance 310, conductor 210, middle lower operated contact of key 202 to lamp 205, but the resistance in this circuit is too high to cause the lamp to light. In the trunk circuit, relay 504 operates, closing an obvious circuit for relay 506.

The test man now operates the dial key 402 which is associated with the plug 201 closing a circuit from battery through the winding of relay 401, outer lower front contact of relay 308, upper contact of dial key 402, to ground at the back contact of relay 403. Relay 401 operates, in turn operating relay 405. Relay 405 closes a circuit from battery through the winding of relay 406, normal contacts of relay 407, lower front contact of relay 405, normal contact of polarized relay 408 to ground at the normal contacts of relay 409. Relay 406 operates in this circuit closing a holding circuit for itself over its upper alternate contacts, outer upper front contact of relay 401, tip conductor 208, middle upper front contact of relay 203, upper normal contact of key 207, tips of plug 201 and jack 501, upper back contact and winding of relay 507 to ground. Relay 507 being shunted by the operating ground for relay 406, does not operate. Relay 406 closes a circuit from ground over its lower front contact through the winding of relay 407 and battery. Relay 407 locks over its upper alternate contact, lower front contact of relay 405, normal contact of relay 408 to ground at the normal contacts of relay 409, opening the operating circuit of relay 406, permitting relay 507 to operate. Relay 507 locks over its outer upper front contact to battery at the outer upper front contact of relay 506 and extends the tip and ring trunk conductors through to the armatures of relay 502, whence the tip conductor extends over the outer upper back contact of relay 502, upper back contact of relay 508, conductor 509, resistance 602, lower back contact of relay 603 to ground, and the ring conductor extends over the lower back contact of relay 502, winding of polarized relay 510, lower back contact of relay 508, conductor 511, resistance 607, inner lower back contact of relay 603, middle upper back contact of relay 604, upper winding of relay 610 to battery at the back contact of release magnet 611.

The operation of relay 507 opens the holding circuit of relay 406 and that relay releases. When relay 406 releases, it closes a bridge across the tip and ring conductors extending from tip conductor 208, outer upper front contact of relay 401, normal contacts of relay 406, contacts of dial 404, winding of polarized relay 408, outer lower front contact of relay 401 to ring conductor 209. The closure of this bridge permits relay 610 to operate, in turn operating relay 612. Relay 612 grounds conductor 613, and prepares a permanent signal alarm circuit and the operating circuit for the vertical magnet 617. The grounding of conductor 613 completes a circuit over the inner upper back contact of relay 605, outer upper back contact of relay 604, to the winding of relay 606 and battery. Relay 606 locks over the outer upper back contact of relay 604, lower front contact of relay 606, outer lower back contact of relay 604, lower back contact of relay 609, outer upper normal contacts of relay 608 to grounded conductor 613.

Relay 406 also closes a circuit from ground over its lower back contact, lower front contact of relay 407, winding of relay 410 and battery. Relay 410 in turn operates relay 411, which connects holding ground to the windings of relays 301 and 302 and closes an obvious circuit for relay 403, which locks under the control of the dial key 402. Relay 411 also lights lamp 412 and closes the holding circuit for relay 401 from ground over the outer lower front contact of relay 411, inner lower front contact of relay 401, outer lower front contact of relay 308 to the winding of relay 401 and battery. The lighting of lamp 412 indicates to the test man that the circuit is ready for dialing.

He now operates the dial 404 for the proper digits to select the test line. In response to the dialing pulses, relay 610 releases, closing a circuit from ground over its lower back contact, lower front contact of relay 612, lower back contact of relay 608, winding of relay 616, winding of vertical magnet 617 to battery. Magnet 617 responds to the pulses to advance the transmission selector 600 to the desired level. Relay 616 also operates in this circuit and, being slow to release, remains operated throughout the digit. The first vertical step of selector 600 closes the vertical off-normal contact 618 to complete a circuit from battery over the back contact of release magnet 611, off-normal contact 618, winding of relay 623, lower front contact of relay 616 to grounded conductor 613. Relay 623 closes a holding circuit for itself from battery over the back contact of magnet 611, off-normal contact 618, winding of relay 623, back contact of rotary magnet 622 to ground at the front contact of relay 623. Therefore, relay 623 remains operated independent of relay 616, but dependent on rotary magnet 622. A branch of the holding circuit of relay 623 extends through the winding of relay 608 to grounded conductor 613 but relay 608 is shunted, first by the operating ground for relay 623 over the contact of relay 616, then by the holding ground at the contact of relay 623 and later by ground from busy trunks over brush 621. Relay 616 also closes a circuit from battery through the winding of relay 609, inner contact of relay 616 to grounded conductor 613. Relay 609 locks over the outer upper normal contacts of relay 608 to grounded conductor 613 and opens the locking circuit of relay 606.

When relay 616 falls back at the end of the digit, a circuit is closed from battery through the winding of rotary magnet 622, upper front contact of relay 623, normal contacts of relay 616 to grounded conductor 613 and the magnet operates, advancing the transmission selector to the first set of terminals. The operation of magnet 622 opens the circuit of relay 623 and that relay releases, in turn releasing the magnet 622. If the connector appearing in the first set of terminals is busy, ground over brush 621 will be extended over the inner lower back contact of relay 608, upper back contact of rotary magnet 622 to the winding of relay 623 and to battery as previously traced. Relay 623 reoperates, again closing a circuit for magnet 622 and this relay and magnet cooperate to advance the selector to an idle connector, at which time no circuit is provided for relay 623 and both relay 623 and magnet 622 remain unoperated. With relays 616 and 623 released and brush 621 engaging an idle connector sleeve, relay 608 may now operate, extending ground from conductor 613 over its outer lower front contact to brush 621 to mark the connector busy.

Relay 608 further opens the locking circuit of relay 606 and transfers the holding circuit of relay 609 from the direct connection with conductor 613 over its inner upper front contact to brush 624 and over the inner lower back contact of relay 801 in the connector circuit back to brush 621 and ground. Therefore, relay 609 remains operated, connecting a shunt around the winding of relay 629 and establishing a pulsing circuit which may be traced from battery through the lower winding of relay 802, inner upper back contact of relay 801, brush 626, inner lower front contact of relay 608, lower front contact of relay 610, lower back contacts of relays 627 and 605, lower right winding of repeating coil 601, resistance 628, outer upper front contact of relay 609, upper right winding of coil 601, lower front contact of relay 609, upper back contacts of relays 605 and 627, outer upper front contact of relay 608, brush 625, middle upper back contact of relay 801 to ground through the upper winding of relay 802. Relay 802 closes a circuit from ground over the outer upper back contact of relay 801, front contact of relay 802, upper winding of relay 803 to battery. Relay 803 closes a locking circuit for itself from battery through its upper winding and inner upper front contact, upper back contact of relay 804, inner lower back contact of relay 801 to brush 621 and ground.

When the test man dials the next digit, relay 610 follows the pulses as before and intermittently opens the circuit of relay 802, which closes a circuit from ground over the outer upper back contact of relay 801, back contact of relay 802, lower front contact of relay 803, normal contact 805, windings of relay 806 and vertical magnet 807 to battery. Magnet 807 operates in this circuit advancing the connector 800 one step vertically to close off-normal contact 808 and open contact 805. Relay 806 is slow to release and closes a holding circuit over its front contact and the off-normal contact 808 to the front contact of relay 803, which holding circuit is maintained throughout the digit. The vertical magnet continues to follow the pulses until it brings the connector to the desired level. At the end of the digit, relay 806 releases and extends the pulsing circuit over its back contact to the windings of relay 809 and rotary magnet 810 which respond to the last digit to rotate the connector 800 into association with the test line. Relay 809 remains operated throughout the digit, closing a circuit from battery through the winding of relay 804, front contact of relay 809 to brush 811 to test the condition of the test line, since it may be selected by other connectors.

Assuming that the test line is idle, relay 804 does not operate and relay 809 releases at the end of the digit. At this time a circuit is closed from battery through the winding of relay 910 in the test line over brush 904 in its normal position, sleeve brush 811 of connector 800, back contact of relay 809, back contact of relay 804, outer lower normal contacts of relay 801, next-to-the-inner upper front contact of relay 803, upper winding of relay 801 to ground over brush 621. Relays 910 and 801 operate in this circuit, relay 801 closing a locking circuit for itself from battery through its lower winding and inner lower front contact to brush 621. The operation of relay 801 opens the holding circuit for relay 609 and that relay releases, establishing a connection in the transmission selector between brushes 621 and 624 which may be traced from brush 624 over the inner upper front contact of relay 608, lower back contact of relay 609, outer lower back contact of relay 604, back contact of relay 606 to grounded conductor 613 and brush 621, thereby reestablishing a holding circuit for relay 803 before that relay can release. Relay 609 also opens the shunt around relay 629 and extends the upper right winding of repeating coil 601 over the outer upper back contact of relay 609 to the upper winding of relay 630 and ground through resistance lamp 631 and the lower right winding of repeating coil 601 to battery over the inner upper back contact of relay 609 through the lower winding of relay 630 and resistance lamp 633. The release of relay 609 closes a circuit from battery over the back contact of magnet 611, off-normal contact 629, winding of relay 603, middle upper back contact of relay 609 to ground. Relay 603 reverses the connection of battery and ground to the incoming trunk as a signal that dialing has been completed. With relay 603 operated, tip conductor 509 is extended through the upper left winding of repeating coil 601, resistance 634, inner upper front contact of relay 603, next-to-outer upper back contact of relay 604, upper winding of relay 610 to battery over the back contact of release magnet 611, while the ring conductor 511 is extended through the lower left winding of repeating coil 601, middle upper front contact of relay 603, inner upper normal contacts of relay 604, lower winding of relay 610, resistance 635 to ground at the outer lower front contact of relay 603. This reversed battery operates both polarized relays 510 and 408.

Relay 510 connects battery over the inner upper normal contacts and winding of relay 502 to ground. Relay 502 locks under the control of relay 506, disconnects relay 510 from the trunk, and extends the incoming and outgoing ends of the trunk to repeating coil 512. It thereby transfers the holding bridge for relay 610 from the dialing circuit to the winding of relay 505, operating that relay to connect direct ground to the lower winding of relay 504. This low resistance connection operates marginal relay 305.

Relay 408 opens the holding circuit for relay 407, thereby in turn releasing relays 410 and 411 and extinguishing lamp 412. Following the extinguishing of lamp 412 the operator will restore dial key 402, releasing relays 401, 405 and 403, thereby restoring the dialing circuit to normal. The release of relay 405 connects ground from the normal contact of relay 405 over the front contact of relay 306 through resistance 314 to lamp 205, causing the lamp to light.

Assuming that it is desired to test the coin features of the transmission selector as well as the supervisory features, the test man will now insert plug 220 of the coin control cord 350 in the jack 551 of the trunk outgoing to a coin control selector associable with the transmission selector 600. A circuit is thereby closed from battery through resistance 453 over the sleeve conductor of cord 350, plug 220, jack 551 through the winding of relay 555 to ground. At the same time battery through resistance 454 is connected over the upper normal contacts of key 451, normal contacts of key 450, the tip conductor of cord 350, plug 220 and jack 551, completing a circuit through the winding of relay 552 to ground. Relay 552 closes an obvious circuit for relay 553. With relays 552 and 555 operated, ground over the lower normal contacts of key 451, normal contacts of key 452, rings of cord 350, plug 220 and jack 551, is connected over the outer right front contact of relay 552, inner right back contact of relay 554 to conductor 559 and resistance 701 in the coin control selector, while battery through resistance 557 is connected over the inner right contact of relay 555, outer right back contact of relay 554 to conductor 560 and resistance 705. Relay 555 also lights lamp 556.

In the coin control selector the circuits from battery and ground above traced extend from resistance 701 over the outer upper back contact of relay 706, upper back contact of relay 707, lower back contact of relay 702, in shunt of the windings of relays 702 and 703 to the winding of relay 704 and resistance 705. Relay 704 operates, closing a circuit from ground over its front contact through the winding of relay 716 and battery. Relay 716 grounds conductor 717 to provide locking circuits for use hereinafter and also prepares the circuit for vertical magnet 712. The test man now operates key 452 to insert the dial 404 in the ring conductor, the circuit extending from ground over the lower normal contacts of key 451, upper alternate contacts of key 452 through the contacts of dial 404, over the lower alternate contacts of key 452 to the ring conductor. The operation of the dial causes the intermittent release of relay 704 in the usual manner. When relay 704 falls back following the first pulse, it closes a circuit from ground over its back contact, upper front contact of relay 716, normal contact 110, winding of relay 711, winding of vertical magnet 712 to battery. Relay 711 in the usual manner closes a holding circuit over its front contact and the off-normal contact 713 which becomes effective when selector 700 has taken one vertical step. The selector is raised under the control of vertical magnet 712 to the desired level. At the termination of the digit, relay 711 falls back, transferring the pulsing circuit through the winding of relay 715, normal rotary contact 719 to the winding of rotary magnet 718 and battery. Relay 715 functions in a manner similar to relay 711, closing a circuit over the back contact of relay 711 and its own upper front contact independent of the rotary contacts. When the digit is completed, relay 715 releases, closing a circuit from battery through the winding of rotary magnet 718, off-normal contact 720, back contact of relay 715, upper back contact of relay 708, lower winding of relay 706 and ground. Relay 706 operates in this circuit, but magnet 718 does not. Relay 706 opens the shunt around the windings of relays 703 and 702 so that these relays are now included in series with relay 704. Relay 703 operates, closing a second holding ground for relay 716, but relay 702 is energized in the wrong direction to operate. The coin control selector remains in this condition until it is desired to make the coin control test. The test man will now restore the dialing key 452 disconnecting the dial from the coin control selector.

The operation of relay 910 in the test circuit as previously described, grounds conductor 911 to provide locking ground for various relays and disconnects ground from the contacts of the arc of switch 900 associated with brush 901, which controls the return to normal of the switch 900. It also connects interrupted ground over its outer upper contact to the winding of relay 913 and battery. Interrupter 912 is arranged to give a .3 second closure and a .2 second open period and relay 913 follows these interruptions. With relay 910 operated, the test line waits for the application of ringing current.

When lamp 205 lights, indicating to the test man that the connection with the test line has been completed, he operates ringing key 207, connecting the tip of plug 201 over the inner upper operated contact of key 207 to battery in the position circuit through resistance 311. This battery extends over the tip of jack 501, upper front contact of relay 507, middle upper front contact of relay 502, upper left winding of repeating coil 512, winding of relay 508 to ground. Relay 508 operates in response to the closure of this circuit, connecting ringing current from source 513 through lamp resistance 514 over the lower front contact of relay 508, conductor 511, lower left winding of repeating coil 601, middle upper front contact of relay 603, condenser 637, winding of relay 636, upper left winding of repeating coil 601, conductor 509, upper front contact of relay 508 to ground. Relay 636 operates in this circuit, closing an obvious circuit for relay 605 and a holding circuit for that relay during the application of ringing current.

Relay 605 in operating disconnects brush 624 from conductor 613, thereby opening the holding circuit for relay 803, which releases. Relay 605 also opens the circuit of relay 606, which closes a substitute connection between conductor 613 and brush 624 after an interval. Relay 606 is made slow to release to insure the complete restoration of relay 803 before the reclosure of the control lead.

With relay 803 released the tip brush of connector 800 is extended over the outer upper back contacts of relays 804 and 803, middle lower front contact of relay 801 to ground and the ring brush of the connector is extended over the next-to-outer upper back contacts of relays 804 and 803 through the lower winding of relay 803, outer upper front contact of relay 801 to ringing source 812. Ringing tone is transmitted to the originating point through condenser 814.

In the test circuit, the ringing current passes from the ring conductor through the winding of relay 914, condenser 915, upper back contact of relay 916 to the tip conductor, operating relay 914, which closes a circuit in parallel with its own winding over its front contact through the winding of relay 917. Relay 917 in response to ringing current closes an obvious circuit for relay 918 which is slow to operate and after an interval closes a circuit at its lower contact over the upper back contact of relay 919, normal terminal of brush 902, inner lower front contact of relay 913 to the winding of magnet 907 of switch 900 and battery. When relay 913 operates under the control of interrupter 912, magnet 907 is operated and when relay 913 releases the switch is advanced to position 1. In this position the circuit for magnet 907 extends over the inner lower front contact of relay 913, upper back contact of relay 920 through the first to thirteenth terminals of brush 902, which are strapped together, to ground as above. Therefore, switch 900 continues to step under the control of interrupter 912 until it reaches position 3. The time thus consumed provides an interval in which the test man may recognize the ringing induction tone applied by the connector. This interval varies from 1.0 to 1.5 seconds, depending upon the position of the interrupter 913 at the moment of ringing.

In position 3 of switch 900 a circuit is closed from battery through the winding of relay 916, upper front contact of relay 918, upper back contact of relay 921, brush 906 in position 3 to ground over conductor 911. Relay 916 locks over its inner upper front contact to conductor 911 and connects ground to brush 902 independent of relay 918, to permit switch 900 to continue to advance under the control of interrupter 912 and relay 913. Relay 916 opens the ringing bridge through relays 914 and 917 and condenser 915 and substitutes therefor a direct current tripping bridge extending from the tip conductor over the outer upper front contact of relay 916, inner upper back contact of relay 924, outer upper back contact of relay 925 through resistance 923 in parallel with resistance 922 and the upper back contact of relay 926, outer upper back contact of relay 928, right winding of repeating coil 927 to the ring conductor. This direct current bridge permits the operation of relay 803, which again locks through its upper winding to ground over brush 624. If relay 803 operates properly, the ringing current is cut off and the tip and ring conductors are again extended through the connector and over the terminals of the test line to the bridge above traced. During the remainder of the tripping interval, a steady low tone over conductor 929 is connected through condenser 930, outer lower contact of relay 916, lower back contact of relay 919, upper back contact of relay 931, outer lower back contact of relay 928, outer upper back contact of relay 924 to the left winding of repeating coil 927. This tone continues for 1.5 seconds during which time the switch 900 is advanced through positions 3, 4, and 5 under the control of relay 913.

When switch 900 enters position 6, a circuit is closed from battery through the winding of relay 924, lower back contact of relay 932, brush 903 in position 6, inner lower front contact of relay 910, inner upper front contact of relay 916, to grounded conductor 911. Relay 924 opens the bridge above traced and the tone circuit to the right winding of coil 927.

When relay 803 reclosed the talking conductors, relay 630 operated, in turn operating relay 604. Relay 604 disconnects relay 610 from the incoming end of the trunk and closes a holding circuit for relay 610 from battery over the back contact of release magnet 611, upper winding of relay 610, resistance 638, inner upper front contact of relay 604, lower winding of relay 610, resistance 635 to ground at the lower front contact of relay 603. Relay 604 also closes ground from its middle lower front contact, over the lower back contact of relay 609, and the outer upper front contact of relay 608 to brush 624. The removal of battery and ground from the trunk causes the release of relay 505, opening the direct ground connection through the lower winding of relay 504 and substituting the ground shunted battery present on the winding of relay 502 through resistance 503. Relay 305 releases in this circuit, opening the low resistance circuit for supervisory lamp 205 and extinguishing that lamp.

When relay 924 opens the bridge across the connector terminals, relay 630 releases, in turn releasing relay 604 which restores the connection of relay 610 to the trunk, reoperating relays 505 and 305 and relighting lamp 205.

The test line proceeds to apply a short series of flashes through different loop resistances in order to provide current flow, soak, release and operate tests for relay 630 in the transmission selector 600. These flashes also serve to test the supervisory features of the various sections of the trunk. The loop is first varied through resistances to give two release and two soak tests which are followed by two operate tests and two open-circuit release tests. This makes a total of four open and four closed periods which can be counted as lamp flashes at the toll board to provide a check upon the results of the test. At this time also the tone signals applied during the loop closures enable the test man to make a rough test of the transmission qualities of the trunk.

In position 6 of switch 900 a circuit is closed from battery through the winding of magnet 907 and its interrupter contact, brush 905 in position 6, inner lower back contact of relay 932 to grounded conductor 911, advancing the switch immediately to position 7, in which position relay 924 is held operated. The timed advance from position 7 under the control of relay 913 measures off a half second opening of the bridge as above described. When the switch 900 leaves position 7, relay 924 releases, reclosing the bridge as first traced, the closure remaining until the switch reaches position 10.

In position 10 a circuit is closed from battery through the winding of relay 926, brush 905 in position 10, inner lower back contact of relay 932 to grounded conductor 911. Relay 926 opens the branch of the bridge through resistance 922 and closes a substitute shunt around resistance 923 extending over the upper front contact of relay 926, inner upper back contact of relay 928, winding of polarizing relay 933, upper back contact relay 934 and the lower back contact of relay 924. Relay 933 is polarized to operate in response to connection with local connectors and therefore has no function in the present test, but its resistance is equal to that of resistance 922 so that the closure through its winding continues the first soak test. Relay 926 locks over its inner lower front contact, inner lower back contact of relay 932 to conductor 911. It also prepares certain circuits to be used later.

When switch 900 reaches position 11, the circuit for relay 924 is again closed, remaining closed through positions 12 and 13. At this time relay 913 will be normal, having just released to advance the switch. With relays 924 and 926 operated, the bridge across the tip and ring conductors now extends over the outer upper contact of relay 916, outer lower contact of relay 926, high resistance 935, inner upper back contact of relay 925, through resistance 923 and in parallel therewith over the lower front contact of relay 924 and resistance 936, upper back contact of relay 928 and through the right winding of repeating coil 927. This provides a release test of relay 630 during the released time of relay 913. When relay 913 operates, resistance 935 is short-circuited over the inner upper front contact of relay 913 and the outer upper back contact of relay 925, thereby reducing the resistance to the soak value, during the .3 second operated period of relay 913, during which time switch 900 is still standing in position 11. With relay 924 operated, the tone circuit extends from source 929, lower front contact of relay 916, lower back contact of relay 919, upper front contact of relay 913, upper front contact of relay 926 to the left winding of coil 927. Switch magnet 907 is operated but does not advance the switch until relay 913 releases, at which time the switch advances to position 12 in which position the shunt around resistance 935 is opened to apply another release test. During the .2 second released period of relay 913, no tone is transmitted to the test man, the primary circuit of coil 927 being opened at the contacts of relay 913.

With switch 900 in position 12, the operation of relay 913 after the .2 second release test closes a circuit from battery through the winding of relay 925, outer lower front contact of relay 913, brush 905 in position 12, inner lower back contact of relay 932 to grounded conductor 911. Relay 925 locks through its outer lower front contact, upper back contact of relay 938, to grounded conductor 911. Relay 925 opens the release test circuit through resistance 935 and substitutes an operate circuit which may be traced from the tip conductor, over the outer upper front contact of relay 916, outer lower front contact of relay 926, inner upper front contact of relay 913, resistance 939, lower front contact of relay 924, resistance 936, outer upper back contact of relay 928, right winding of repeating coil 927 to the ring conductor. This test continues for the .3 second interval prior to the release of relay 913. When relay 913 releases, the loop is broken completely and switch 900 is advanced to position 13. After a .2 second interval relay 913 reoperates and closes the tone circuit and the operate test loop. After a .3 second interval, the release of relay 913 again breaks the loop and the tone circuit and lets the switch advance into position 14.

When switch 900 reaches position 14 a circuit is closed from battery through the winding of relay 932, brush 906 in position 14 to grounded conductor 911. Relay 932 locks directly to conductor 911, opening the holding circuit for relay 926. A circuit is now closed from battery through the winding of magnet 907 and its interrupter contact, inner upper front contact of relay 932, brush 902 in positions 14 to 20, inclusive, to ground at the inner lower front contact of relay 916. Switch 900 is therefore automatically advanced to position 21. Relay 932 also opens the operating circuits for relay 924 which have been previously traced.

When switch 900 is in position 21, the circuit for magnet 907 controlled by relay 913 again becomes effective and the switch advances through the normal position to position 3. The total time consumed in passing through positions 14 to 2, inclusive, is two seconds and during this interval the loop and tone circuits are held opened, since relay 924 is operated over brush 903, inner lower front contact of relay 910, inner upper front contact of relay 916 to grounded conductor 911 in these positions of switch 900.

During the second revolution of switch 900 the test line applies a ring-up bridge and a direct current bridge across the line to permit a test to be made of the ability of the toll operator to rering from the toll board to a private branch exchange trunk. As the switch 900 enters position 3, relay 924 releases and at its inner upper contact recloses the loop through resistances 939 and 923, while at its outer upper contact it recloses the tone circuit. Since relay 925 is operated, a circuit is now closed from battery through the winding of relay 921, inner lower front contact of relay 925, brush 903 in position 3 to ground over the front contacts of relays 910 and 916 as previously traced. Relay 921 locks directly to grounded conductor 911 and closes a ringing current bridge between the tip and ring conductors through the winding of relay 914, condenser 915, outer upper front contact of relay 921, upper front contact of relay 925, over the inner upper back contact of relay 924 and the outer upper front contact of relay 916 to the tip conductor.

Reconnection of tone to the circuit informs the test man that the test line is ready to make the rering test to a private branch exchange and he operates the ringing key, again operating relay 636. Relay 604 being operated, ground is not disconnected from the control conductor leading to brush 624 and relay 803 is not released. However, relay 636 operates relay 605 which opens the circuit of relay 630 and extends the tip conductor over the outer upper front contact of relay 605, inner lower front contact of relay 604 to ground and extends the ring conductor over the outer lower front contact of relay 605, next-to-the-inner upper front contact of relay 604 to ringing current source 639. Due to its make-before-break contacts, relay 605 closes a holding circuit for relay 630 from battery through ballast lamp 633, upper contact of relay 603, lower winding of relay 630, inner upper back contact of relay 609, lower right winding of repeating coil 601, resistance 640, inner lower front contact of relay 605, front contact of relay 630 to ground.

If the ringing current is received by the test line, relay 914 operates, again bridging its winding by the winding of relay 917 which closes an obvious circuit for relay 918. Relay 918 closes a circuit from grounded conductor 911 over the inner upper front contact of relay 916, front contact of relay 918, inner upper front contact of relay 921 to the winding of relay 919 and battery. Relay 919 locks over the inner lower contact of relay 928 and the upper back contact of relay 937 to grounded conductor 911 and transfers the tone circuit from the steady low tone on conductor 929 to ringing induction tone furnished over conductor 941, informing the test man, as soon as he restores the ringing key, that the ringing current was received. Relay 919 closes a circuit from battery through the winding of relay 920, upper back contact of relay 942, outer upper front contact of relay 919 to ground at the front contact of relay 918. Relay 920 locks in a circuit from battery through its winding, winding of relay 942, inner upper front contact of relay 920, brush 902 in positions 1 to 13, inclusive, to ground at the inner lower front contact of relay 916. Relay 942 cannot operate in this circuit being shunted by the operating circuit of relay 920 as long as ringing current continues to be applied. Relay 920 also prevents the advance of switch 900 during the application of ringing current. When the ringing key is restored, relay 942 operates closing a circuit for relay 924 over the inner lower front contact of relay 942, inner lower front contact of relay 910, inner upper front contact of relay 916 to grounded conductor 911. Relay 924 cuts off the tone and opens the bridge as before. Relay 942 also closes a circuit from ground over its outer lower front contact, terminals 3 to 14, inclusive of brush 901, interrupter contact and winding of magnet 907 to battery, advancing the switch to position 14 where relays 920 and 942 release. With the switch 900 in position 14 and relays 920 and 942 released, relay 924 is held operated over brush 903 in positions 14 to 2, inclusive, as previously described.

If the test man does not make the rering test, switch 900 is advanced under the control of the interrupter taking 5.5 seconds to advance from position 3 to position 14 and then automatically through positions 14 to 2 in the manner described in the first revolution.

During the third revolution of switch 900, the test line arranges for a coin refund test with a bridge across the line. In position 2 of the third revolution, a circuit is closed from battery, through the winding of relay 938, outer lower front contact of relay 921, inner lower back contact of relay 931, brush 906 in position 2 to grounded conductor 911. Relay 938 locks directly to conductor 911. Relay 938 opens the locking circuit of relay 925 which now releases, opening the ring-up bridge across the line. When switch 900 reaches position 3, relay 924 releases, again closing the direct current bridge through resistances 923 and 939. In addition a simulated coin ground is closed from ground at the inner lower back contact of relay 937, outer upper front contact of relay 938, resistance 943 through the winding of relay 944, upper back contact of relay 928, winding of relay 933, upper back contact of relay 934, lower back contact of relay 924, to the mid-point between resistances 939 and 923 and therefore to both tip and ring conductors.

The coin ground is maintained on the line for a 5.5 second interval provided the test man does not operate the coin refund key. During this test the audible tone gives an indication to the test man of the success or failure of the ringing test, if made, since, with relay 919 operated in response to such a successful test, ringing induction is transmitted while in the absence of such a test or the failure of the test, a steady low tone is given.

The operation of coin refund key 451 disconnects battery and ground from the tip and ring conductors of the plug 220 thereby disconnecting ground from conductor 559 and opening the circuit of relay 552. Relay 552 is slow to release and after an interval closes its right back contact, connecting ground through resistance 553 over the front contact of relay 555, back contact of relay 552, and the right back contact of relay 554 to conductor 559. The disconnection of ground from conductor 559 releases relays 703 and 704. Relay 704 closes a circuit from ground over its back contact, front contact of relay 716, lower front contact of relay 706, upper winding, normal contacts and lower winding of relay 707 to battery. Relay 707 in operating locks through its lower winding and lower front contact, upper back contact of relay 733 to grounded conductor 717. Relay 707 is slow to operate while relay 716 is slow to release. The connection of resistance ground to conductor 559 permits the reoperation of relay 703 but does not furnish sufficient current to operate relay 704. Relay 703 provides a circuit for holding relays 716 and 707 before they have time to release.

Relay 707 closes a circuit from battery through the upper winding of relay 708, outer upper front contact of relay 707 to grounded conductor 717. Relay 708 locks from battery through its lower winding, over its inner lower front contact, front contact of relay 716, back contact of relay 704 and ground. With relay 708 operated, the operating circuit of relay 706 is opened, but relay 707 closes a circuit from ground through interrupter 725 over its inner upper front contact to the inner upper front contact and upper winding of relay 706 to battery, holding relay 706 operated till the next ungrounded period of the interrupter 725 to insure a complete application of the coin current. With relay 706 released, the interrupter is connected over the inner upper front contact of relay 707, inner upper back contact of relay 706 to the winding of relay 733 and battery.

Relay 708 closes a circuit from ground at the front contact of relay 703, inner upper front contact of relay 708, brush 722 of coin control selector 700, conductor 730 to the winding of relay 627 and battery. Relay 627 disconnects the tip and ring conductors from the repeating coil 601, connecting both to conductor 729. Relay 627 also connects conductor 511 over its inner upper front contact to conductor 731, brush 723, condenser 724, middle lower front contact of relay 708, lower back contact of relay 702 to tone source 732 which transmits a high tone to the originating position to indicate that coin refund current is being applied. When relay 733 operates on the next grounded period of interrupter 725 it closes a circuit from coin return battery source 727, inner back contact of relay 702, winding of relay 728, upper front contact of relay 733, brush 721 of coin selector 700 to conductor 729.

The application of negative coin battery to the tip and ring of the test line, operates both relays 944 and 933. Relay 944 is marginal so that while it will operate in response to the coin battery, it will not operate in response to the regular transmitter battery from the toll transmission selector. With relays 933 and 944 operated, a circuit is closed from ground, front contact of relay 933, upper front contact of relay 932, front contact of relay 944, lower back contact of relay 934, upper back contact of relay 942, to the winding of relay 920 and battery. Relay 920 locks as before through the winding of relay 942, the latter relay remaining deenergized until the removal of the coin refund current. Relay 920 in operating opens the circuit for advancing switch 900 bringing the switch to rest. It also closes a circuit from battery through the winding of relay 931, lower front contact of relay 920, lower front contact of relay 938, inner lower back contact of relay 928, upper back contact of relay 937 to grounded conductor 911. Relay 931 locks over its upper front contact, back contact of relay 945 to grounded conductor 911.

When the coin return key is restored, relay 552 is reoperated and low resistance ground is again connected to the circuit of relay 704 causing that relay to reoperate.

Since simulated coin ground is applied by the test line, relay 728 operates in the coin refund circuit and closes a substitute holding circuit for relay 707 over its front contact to ground at the front contact of relay 716. When relay 704 reoperates, it opens one holding circuit for relay 708. When the interrupter 725 opens its contact, relay 733 releases, disconnecting coin refund battery from conductor 729 and releasing relay 728. It also releases relays 933 and 944 opening the operating circuit of relay 920 and permitting relay 942 to operate. With relay 942 operated, a circuit is closed from battery through the winding of relay 924, lower front contact of relay 942, inner lower front contact of relay 910, upper front contact of relay 916 to grounded conductor 911. Relay 924 in operating opens the bridge across the tip and ring conductors of the test line and also removes coin ground simulating the return of the coin. The release of relay 728 opens one holding circuit of relay 707. At the next closure of interrupter 725 relay 733 reoperates. Since the coin ground has been removed relay 728 cannot reoperate and relay 707 releases in turn releasing relay 708. The operation of relay 942 closes the previously traced circuit for advancing the switch 900 to the position 14, while the switch is passed through positions 14 to 2 in the manner previously described.

During the fourth revolution of switch 900 a coin collect test is prepared. In position 2 of this fourth revolution a circuit is closed from battery through the winding of relay 934 and in parallel therewith through the winding of relay 928 and the upper outer lower back contact of relay 937, and thence over the inner lower front contact of relay 931, brush 906 in position 2 and grounded conductor 911. Relay 934 locks to the grounded conductor 911 over its inner lower front contact holding relay 928 under the control of relay 937. Relay 928 opens the locking circuit of relay 919 which releases.

If the coin return test was not made, or if it was attempted and failed so that relays 920 and 942 were not operated, then relay 931 cannot operate and when switch 900 reaches position 1 of the fourth revolution a circuit is closed from battery through the winding of relay 937, outer lower back contact of relay 931, lower front contact of relay 938, brush 906 in position 1 to grounded conductor 911. Relay 937 locks to conductor 911 and opens the circuit of relays 934 and 928 so that the coin collect test is omitted.

The operation of relays 928 and 934 reverses the polarity of relay 933 with respect to the tip conductor so that the relay may respond to the positive coin collect battery. The coin ground circuit extends from the tip brush of connector 800, front contact of relay 916, upper back contact of relay 924, upper back contact of relay 925, lower back contact of relay 924, upper front contact of relay 928, winding of relay 933, upper front contact of relay 934, winding of relay 944, resistance 943 over the upper front contact of relay 938 to ground at the lower back contact of relay 937.

The operation of the coin collect key 450 at the operator's position disconnects battery from the tip of the cord 350, but does not interfere with the connection of ground to the ring of the cord. Relay 552 releases due to the disconnection of battery from its winding, substituting high resistance ground for the low resistance ground as for coin refund. However, it also extends the ground on the ring of the cord over its left back contact, front contact of relay 553, which being slow to release remains operated for an interval after relay 552 releases, through the winding of relay 554 and battery. Relay 554 reverses the connection of battery and ground to conductors 560 and 559. When relays 552 and 554 release, the connection of battery and ground to these conductors is restored, but with relay 552 released, high resistance ground through resistance 558 is applied to conductor 559. Relay 702 responds to the reversed battery and locks over its inner upper front contact and the outer upper front contact of relay 706 to grounded conductor 717. When the current is restored relay 703 reoperates, but relay 704 does not. With relay 702 operated, a low tone is applied over its outer lower front contact to conductor 731 and coin collect battery through ballast lamp 726 is connected over the inner lower front contact of relay 702 to the winding of relay 728 and the armature of relay 733 in preparation for connection to conductor 729. Otherwise the operation is the same as for coin refund.

Application of coin collect battery operates relays 944 and 933. With relay 934 operated, the operation of these relays closes a circuit from ground over the front contact of relay 933, outer upper front contact of relay 932, front contact of relay 944, outer lower front contact of relay 934, winding of relay 945 to the right winding of repeating coil 927 and the ring conductor. Relay 945 tests the closure of relay 927 to supply collect current over the ring conductor and operates if it is present. Relay 945 opens the locking circuit of relay 931 and closes a circuit from ground over its front contact, back contact of relay 942, winding of relay 920 and battery. Relay 920 operates and locks through the winding of relay 942 but relay 942 does not operate as long as the coin current is applied. Relay 920 stops the switch as before and when the current is removed, relays 933, 944, and 945 release permitting relay 942 to operate. Relay 942 operates relay 924 which removes the coin ground and the tone. The switch then advances quickly to position 14. It restores to position 21 and is advanced under the control of the interrupter to position 3 of a fifth revolution.

In addition, a circuit is closed from battery through the winding of relay 937 over the inner upper front contact of relay 934, or over the outer lower back contact of relay 931, inner lower front contact of relay 938, brush 906 in position 1 to grounded conductor 911. Relay 937 permanently opens the coin ground and releases relay 928 so as to prepare for the reclosure of the loop and in position 3 relay 924 releases and recloses the tone circuit and loop.

If the coin collect test is not made or is attempted and fails to cause the operation of relays 920 and 942, relay 931 will remain locked over the contacts of relay 945. Relay 937 operates under control of relay 934, but the release of relay 924 is ineffective to restore the tone since this circuit is open at the contact of relay 931. This lack of tone during the next 5.5 seconds will notify the test man of the failure of the coin collection.

During this revolution, assuming the coin collection test was successful, the test man may test the ability of the trunk to remain busy at the toll board while the cords are changed in the trunk jacks. With the tip and ring bridged by the test line, relays 630 and 604 in the transmission selector are held operated, disconnecting relay 610 from the trunk and leaving relay 505 de-energized. Under this condition with the plug out of jack 501, relay 504 is held operated from ground through its two windings, back contact of relay 505, resistance 503, inner upper front contact of relay 502 to battery at the upper front contact of relay 506. The transmission selector holds the connection until the cord is again plugged in at the control board.

When the switch reaches position 14 it again causes the loop to be reopened for 2 seconds after which the loop is again closed for 5.5 seconds. This cycle is repeated indefinitely as long as the connection is held.

If the toll board end of the connection is released during the closed interval the switches are held as above until the test line reaches an open interval.

The opening of the loop releases relay 630 which in turn releases relay 604. With relay 604 released, relay 610 is again connected to the incoming trunk conductors, operating relay 505 which opens the holding circuit for relay 504. Relay 504 releases relay 506 opening the locking circuits of relays 507 and 502. When relay 502 releases it disconnects relay 505 from the trunk, releasing relays 505 and 610. Relay 610 in turn releases relay 612 which disconnects ground from conductor 613 and closes a circuit from ground over the lower back contacts of relays 610 and 612, winding of release magnet 611, off-normal contact 619 to battery to restore the transmission selector to normal.

The release of relay 612 disconnects ground from both brushes 621 and 624, releasing relays 801 and 803, closing a circuit from ground over the outer upper back contact of relay 801, back contact of relay 802, lower back contact of relay 803, off-normal contact 815, winding of release magnet 816 and battery, restoring the connector to normal.

The release of relay 801 disconnects ground from brush 811, releasing relay 910.

Relay 910 falls back and closes ground to the restoring circuit controlled by brush 901. The switch then returns to normal. The release of relay 910 restores all relays locked to conductor 911. Since the relay 910 can only be operated in the normal position of switch 900, the test line must have fully restored before it can be seized again.

The test line is also of service in testing toll switching trunks associated with coin control trunks as well as those associated with coin control selectors. Likewise, it may be used for testing AB toll trunks. For such trunks there is no reringing or coin operation. Therefore, the test line after making the primary revolution makes a revolution for the rering test and starts the revolution for coin refund test, but since neither of these tests is made it merely continues to make cycles of 2.0 seconds open and 5.5 seconds closure until the connection is released.

Interoffice trunks other than toll terminate in a local connector such as shown in Fig. 8—A. The operation of such a connector is briefly as follows: When the connector is seized relay 851 operates, in turn operating relay 852 which connects ground to conductor 853 to mark the connector busy. It also grounds conductor 854 to provide locking ground. When the next digit is dialed, relay 851 follows the pulses operating relay 855 and vertical magnet 856 to raise the connector to the desired level. Relay 855 releases at the end of the digit to prepare for the last digit which operates relay 857 in parallel with rotary magnet 858. During the rotary movement of the switch, relay 857 closes a circuit through relay 859 to brush 861 to test the wanted line. If the line is idle, the release of relay 857 opens the circuit of relay 859 and closes a circuit from battery on the sleeve terminal of the wanted line to relay 860. Relay 860 closes a holding circuit for itself, supplies direct ground to brush 861, connects the tip and ring conductors to the contacts of relay 863, and closes the ringing circuit. It also opens the rotary stepping circuit, the test circuit through relay 859 and the release circuit. Ringing current is supplied from source 864 through relay 863 to the ring brush of the connector and ground over the tip brush. Tone is supplied to the originating office through condenser 865. When the called subscriber answers, relay 863 operates, locking under the control of relay 852. Relay 863 switches the tip and ring conductors to the windings of relay 866 which operates, reversing the connection of relay 861 to the incoming circuit for supervisory purposes, and supplying additional holding ground to conductor 854.

An inspection of the drawings will show that battery through the upper winding of relay 866 is connected to the tip brush of the local selector 850 and ground through the lower winding to the ring brush when a connection is completed, while the tip brush of the toll connector 860 receives ground through the upper winding of relay 630 and the ring brush receives battery through the lower winding of relay 630.

When therefore the test line during the first revolution of switch 900 connects relay 933 into the loop, relay 933 will operate, closing a circuit from ground over the contact of relay 933, upper back contact of relay 932 to the winding of relay 937 and battery. Relay 937 locks to grounded conductor 911, opens the ground used for supplying the coin test and prepares a path for operating relay 925 when the switch reaches position 11. With relay 925 operated the release and soak test will be omitted and the supervisory tests are reduced to a series of opens and closures. Immediately following the first revolution, the test line starts its cycle of 2.0 seconds opens and 5.5 seconds closures which continue until disconnection takes place.

Other local trunks are treated in a similar manner.

What is claimed is:

1. In a telephone system, a test line, means for successively establishing a plurality of test conditions in said test line, means for normally maintaining each of said conditions for predetermined periods of time, and means to independently curtail any one or more of said periods.

2. In a telephone system, an operator's position, a test line, trunks interconnecting said position and said test line, means for successively establishing a plurality of test conditions in said test line, means for normally maintaining each of said conditions for predetermined periods of time, and means controlled from said position for independently shortening any one or more of said periods.

3. In a telephone system, a test line, means in said test line for successively establishing a plurality of test conditions, means for connecting said test line with circuits of different types to be tested, means in said test line for identifying certain types of said circuits, and means controlled by said identifying means for canceling certain of said test conditions.

4. In a telephone system, a test line, means in said test line for successively establishing a plurality of test conditions, means for connecting with said test line for testing toll trunks, means for connecting with said test line for testing local trunks, means in said test line for identifying said local trunks, and means controlled by said identifying means for canceling certain of said test conditions.

5. In a telephone system, a test line including a progressive switch, a circuit to be tested, means to connect said circuit with said test line, means controlled by said progressive switch in its first revolution to apply a plurality of tests to said circuit, means to advance said progressive switch through additional revolutions, and means to apply single sets of test conditions during said additional revolutions.

6. In a telephone system, a test line including a progressive switch, a circuit to be tested, means to connect said circuit with said test line, means controlled by said progressive switch in its first revolution to apply a plurality of tests to said circuit, means to advance said progressive switch through additional revolutions, means normally effective during said additional revolutions to apply single sets of test conditions, and means to determine whether said single sets of test conditions shall be effective.

7. In a telephone system, a test line including a progressive switch, circuits to be tested, means for establishing connections from one of said circuits to said test line, means controlled by said progressive switch in its first revolution to apply a plurality of tests to said circuit, means for advancing said progressive switch through additional revolutions, means for applying single sets of test conditions during said additional revolutions, means normally effective to advance said switch to maintain said test conditions for predetermined periods of time, and means controlled over said circuit to advance said switch rapidly to shorten the corresponding period.

8. In a telephone system, a test line including a progressive switch, circuits to be tested, means for establishing connections from one of said circuits to said test line, means controlled by said progressive switch in its first revolution to apply a plurality of tests to said circuit, means for advancing said progressive switch through additional revolutions, means for applying single sets of test conditions during said additional revolutions, means normally effective to advance said switch to maintain said test conditions for predetermined periods of time, means controlled over said circuit to advance said switch rapidly to shorten the corresponding period, and means responsive to control over said circuit during certain revolutions to prepare the test conditions for the next revolution.

9. In a telephone system, a test line including a progressive switch, a circuit to be tested, means to connect said circuit with said test line, means controlled by said progressive switch in its first revolution to apply a plurality of tests to said circuit, means to advance said progressive switch through additional revolutions, means normally effective during said additional revolutions to apply single sets of test conditions, and means controlled over said circuit to determine whether said single sets of test conditions shall be effective.

10. In a telephone system, a test line including a progressive switch, circuits of different types to be tested, means for establishing connections over said circuit to said test line, means controlled by said progressive switch in its first revolution to apply a plurality of tests to circuits of all types, means effective during said first revolution for identifying certain types of said circuits, means to advance said progressive switch through additional revolutions, means to apply single sets of test conditions during said additional revolutions, and means responsive to said identifying means to render said single sets of test conditions ineffective.

11. In a telephone system, a first office, an operator's position at said first office, a second office, trunks interconnecting said offices, a test line at said second office, means under the control of said operator's position for connecting said operator's position with said test line over one of said trunks, means in said test line for establishing a plurality of test conditions for said trunk and means controlled from said operator's position to render said test conditions effective.

12. In a telephone system, a first office, an operator's position at said first office, signaling means at said position, a second office, trunks interconnecting said offices, supervisory equipment in said trunks, a test line at said second office, means under the control of said operator's position for connecting said operator's position with said test line over one of said trunks, means in said test line for establishing a plurality of test conditions for the supervisory equipment of the associated trunk, and means responsive to signaling current from said position for rendering said test conditions successively effective.

13. In a telephone system, an operator's position having ringing keys, coin collect and coin refund keys, a test line, a trunk interconnecting said position and said test line, means in said test line for making a plurality of supervisory tests on said trunk, and means for subsequently successively establishing conditions in said test line for receiving a rering signal, a coin refund signal and a coin collect signal.

14. In a telephone system, an operator's position having ringing keys, coin collect and coin refund keys, a test line, a trunk interconnecting said position and said test line, means in said test line for making a plurality of supervisory tests on said trunk, means for subsequently successively establishing conditions in said test line for receiving a rering signal, a coin refund signal and a coin collect signal, means for normally maintaining each of said conditions for a predetermined length of time, and means responsive to the operation of the proper key at said operator's position to shorten said length of time and to set up the next test condition.

15. In a telephone system, an operator's position having ringing keys, coin collect and coin refund keys, a test line, a trunk interconnecting said position and said test line, means in said test line for making a plurality of supervisory tests on said trunk, means for subsequently successively establishing conditions in said test line for receiving a rering signal, a coin refund signal and a coin collect signal, and means effective during said coin refund test to indicate whether said rering signal was received.

16. In a telephone system, an operator's position having ringing keys, coin collect and coin refund keys, a test line, a trunk interconnecting said position and said test line, means in said test line for making a plurality of supervisory tests on said trunk, means for subsequently successively establishing conditions in said test line for receiving a rering signal, a coin refund signal and a coin collect signal, means for normally maintaining each of said conditions for a predetermined length of time, means responsive to the operation of the proper key at said operator's position to shorten said length of time and to set up the next test condition, and means effective during said coin refund test to indicate whether said rering signal was received.

17. In a telephone system, an operator's position having ringing keys, coin collect and coin refund keys, a test line, a trunk interconnecting said position and said test line, means in said test line for making a plurality of supervisory tests on said trunk, means for subsequently successively establishing conditions in said test line for receiving a rering signal, a coin refund signal, and a coin collect signal, said coin collect condition being established only if said coin refund signal has been received.

18. In a telephone system, an operator's position having ringing keys, coin collect and coin refund keys, a test line, a trunk interconnecting said position and said test line, means in said test line for making a plurality of supervisory tests on said trunk, means for subsequently successively establishing conditions in said test line for receiving a rering signal, a coin refund signal and a coin collect signal, means for normally maintaining each of said conditions for a predetermined length of time, and means responsive to the operation of the proper key at said operator's position to shorten said length of time and to set up the next test condition, said coin collect condition being established only if said coin refund signal has been received.

19. In a telephone system, an operator's position having ringing keys, coin collect keys and coin refund keys thereat, a test line including a progressive switch, trunk lines to be tested, supervisory equipment in said trunks, means for establishing a connection between said operator's position and said test line over one of said trunks, means controlled by said progressive switch in its first revolution to apply a plurality of tests to the supervisory equipment of said trunk, means for advancing said progressive switch through additional revolutions, means for successively applying a rering test condition, a coin refund condition and a coin collect condition during said additional revolutions, means normally effective to advance said switch to maintain each of said test conditions for a predetermined period of time, and means responsive to the operation of the proper key at said operator's position to advance said switch rapidly into position to start the next revolution.

ALFRED E. HAGUE.